US010248431B2

(12) United States Patent
Mataya et al.

(10) Patent No.: US 10,248,431 B2
(45) Date of Patent: Apr. 2, 2019

(54) SYSTEM AND METHOD FOR PRESENTING DRIVER INSTALL FILES WHEN ENABLING A USB DEVICE

(71) Applicant: AVOCENT HUNTSVILLE, LLC, Huntsville, AL (US)

(72) Inventors: James R. Mataya, Everett, WA (US); Christopher R. Hinshaw, Redmond, WA (US); Karl S. Mills, Lynnwood, WA (US)

(73) Assignee: VERTIV IT SYSTEMS, INC., Wilmington, DE (US)

( * ) Notice: Subject to any disclaimer, the term of this patent is extended or adjusted under 35 U.S.C. 154(b) by 26 days.

(21) Appl. No.: 15/523,821

(22) PCT Filed: Jan. 5, 2016

(86) PCT No.: PCT/US2016/012179
§ 371 (c)(1),
(2) Date: May 2, 2017

(87) PCT Pub. No.: WO2016/112008
PCT Pub. Date: Jul. 14, 2016

(65) Prior Publication Data
US 2018/0011715 A1    Jan. 11, 2018

Related U.S. Application Data

(60) Provisional application No. 62/100,121, filed on Jan. 6, 2015.

(51) Int. Cl.
*G06F 9/4401* (2018.01)
*G06F 13/42* (2006.01)
(Continued)

(52) U.S. Cl.
CPC .......... *G06F 9/4411* (2013.01); *G06F 13/385* (2013.01); *G06F 13/4022* (2013.01); *G06F 13/4282* (2013.01)

(58) Field of Classification Search
CPC .. G06F 9/4411; G06F 13/385; G06F 13/4282; G06F 2213/0042
See application file for complete search history.

(56) References Cited

U.S. PATENT DOCUMENTS 6,009,480 A     12/1999  Pleso
6,754,725 B1 *  6/2004   Wright ................. G06F 13/102
                                              710/10
(Continued)

FOREIGN PATENT DOCUMENTS

KR    10-2004-0063626 A    7/2004

OTHER PUBLICATIONS

International Search Report and Written Opinon of the International Searching Authority issued in PCT/US2016/012179, dated Mar. 31, 2016; ISA/KR.

*Primary Examiner* — Glenn A. Auve
(74) *Attorney, Agent, or Firm* — Harness, Dickey & Pierce, P.L.C.

(57) ABSTRACT

The present disclosure relates to a system and method for enabling implementation of a secondary function of a universal serial bus (USB) device on a computer that the USB device is communicating with, wherein an operating system of the computer does not have a required driver which needs to be mapped to the USB device to enable implementation of the secondary function. The system involves a USB device which has the required driver for implementing the secondary function stored therein. The required driver can
(Continued)

be supplied to the computer from the USB device using a control which selects the secondary function of the USB device.

21 Claims, 3 Drawing Sheets

(51) Int. Cl.
*G06F 13/38* (2006.01)
*G06F 13/40* (2006.01)

(56) References Cited

U.S. PATENT DOCUMENTS

| | | |
|---|---|---|
| 7,610,331 B1 * | 10/2009 | Genske ................ H04N 1/2179 |
| | | 709/202 |
| 9,128,695 B2 * | 9/2015 | Hammond ................ G06F 1/30 |
| 2003/0110389 A1 | 6/2003 | Elteto |
| 2004/0006766 A1 | 1/2004 | Kim |
| 2005/0038934 A1 * | 2/2005 | Gotze ................... G06F 9/4415 |
| | | 710/15 |
| 2006/0031623 A1 * | 2/2006 | Bando .................. G06F 9/4411 |
| | | 710/313 |
| 2006/0037015 A1 * | 2/2006 | Mihai ................... G06F 9/4415 |
| | | 717/176 |
| 2006/0101461 A1 | 5/2006 | Han |
| 2006/0209328 A1 * | 9/2006 | Anderson ............ G06F 9/4411 |
| | | 358/1.13 |
| 2008/0126628 A1 * | 5/2008 | Mullis .................. G06F 9/4411 |
| | | 710/63 |

\* cited by examiner

SYSTEM AND METHOD FOR PRESENTING DRIVER INSTALL FILES WHEN ENABLING A USB DEVICE

CROSS-REFERENCE TO RELATED APPLICATIONS

This application is a 371 National Phase of PCT/US2016/012179, filed on Jan. 5, 2016 and published as WO 2016/112008 on Jul. 14, 2016, which claims the benefit of U.S. Provisional Application No. 62/100,121, filed on Jan. 6, 2015. The entire disclosures of the above applications are incorporated herein by reference.

FIELD

The present disclosure relates to systems and methods for communications between a Universal Serial Bus (USB) device and a target device having an operating system, and more particularly to a system and method for enabling a USB device to be installed on an operating system of the target device, where the USB device is not directly supported by the operating system, and without the need for an Internet connection, and further without having to plug in a separate media component with the needed device driver to the target device.

BACKGROUND

The statements in this section merely provide background information related to the present disclosure and may not constitute prior art.

For a USB device to be able to communicate with an operating system of a target device, for example a target computer, the target computer needs to know which driver(s) to use to support the device. For example, if the target computer is running the Microsoft Windows® operating system, and the USB device is directly supported by the Windows® operating system, then the USB device will be auto-mapped, for example by using a driver like "HID" (Human Interface Device) or "Mass Storage" to a driver present in the Windows® operating system. This typically happens when any type of supported USB device is first plugged into a USB port of a computer running the Windows® operating system. The Windows® operating system essentially looks at the class of the supported USB device that it is communicating with and automatically "enumerates" the supported USB device to the appropriate device drivers that are included in the Windows® operating system. By "enumerates" it is meant that the required device drivers are automatically mapped to the USB device by the Windows® operating system.

When using an unsupported USB device to attempt to communicate with a computer running the Windows® operating system, a challenge arises because the Windows® operating system does not know what driver to map to the device. Furthermore, it may not have the necessary driver to support the USB device. This necessitates the user having to supply an ".inf" or driver file(s) to the Windows® operating system which tells it (based on the USB vendor/product ID) the specific driver that the enumerating USB device maps to. Of course, the .inf or driver file(s) could be supplied via an Internet connection to the computer running the Windows® operating system, but the requirement for communicating the .inf or driver file(s) over an Internet connection can itself present challenges. For example, entities often have restricted LAN/WAN access which may prevent the device from accessing the files from the Internet. So updating a driver via the Internet is not often practical in real world applications.

Another option would be to simply include the needed driver install file on a portable media device (e.g., USB flash drive) that is plugged in to a USB port of the target computer. However, this necessitates that the portable media device be physically plugged into every computer that the USB device might need to communicate with. In some applications, and particularly KVM (Keyboard/Video/Mouse) applications, this can be impractical, as the USB device may need to communicate with a plurality of different target computers. Moreover, physical access to the target computer(s) may also be restricted, such as if the target computer is in a data center room with controlled access.

So the challenge remains how to easily and efficiently enable a non-supported USB device to communicate with the operating system of a target computer, and without requiring use of a wide area network such as the Internet, and without the need to physically couple a separate media device with the device install file on it to the USB port of each and every target computer that the USB device needs to communicate with.

SUMMARY

In one aspect the present disclosure relates to a system for enabling implementation of a secondary function of a universal serial bus (USB) device on a computer that the USB device is communicating with, wherein an operating system of the computer does not have a required driver which needs to be mapped to the USB device to enable implementation of at least one unsupported feature of the secondary function of the USB device on the computer. The system may comprise a USB device in communication with the computer and with an electronic device of the user. The USB device may have a primary function along with the secondary function, and includes a USB mass storage device housed in the USB device for use in implementing either the primary function or the secondary function. A file is stored on the USB mass storage device for implementing the secondary function. The file is selectable by a user and includes the required files (.inf and/or driver files) which are needed to enable the unsupported feature(s) of the secondary function of the USB device when being accessed by the computer. A control allows the user to enable the secondary function and have access to the .inf and/or driver files on the USB mass storage device that can be transmitted from the USB device to the computer.

In another aspect the present disclosure relates to a system for enabling implementation of both a primary function and a secondary function of a universal serial bus (USB) device on a computer that the USB device is communicating with, wherein an operating system associated with the computer does not have a required .inf file and/or driver which needs to be mapped to the USB device to enable one or more unsupported features of the secondary function. The system may comprise a USB device in communication with an electronic device of the user and with the computer. The USB device includes a USB mass storage device housed in the USB device and a control for selecting between the primary function and the secondary function. At least one file is stored on the USB mass storage device to implement the secondary function. The at least one file includes the required .inf and/or driver to enable the computer to implement the unsupported feature(s) of the secondary function. The at least one file is supplied from an external electronic device being used by a user, and when the control is actuated to implement the secondary function the at least one file is transmitted to the target computer after being selected by the user. The secondary function, once enabled, enables the user to use the USB device to load an additional file to enable an unsupported tertiary function to be implemented using the USB device.

In still another aspect the present disclosure relates to a method for enabling implementation of a one or more unsupported features of the secondary function of a universal serial bus (USB) device on a computer that the USB device is communicating with, wherein an operating system of the computer does not have a required driver(s) and/or .inf files which needs to be mapped to the USB device to enable implementation of the unsupported features of the secondary function of the USB device. The method may comprise providing a USB device in communication with the computer and with an electronic device of the user. The method further includes providing the USB device with a primary function and a secondary function, and storing the required driver(s) and/or .inf in a file on the USB device. The method still further includes using a control to enable a user to select the secondary function, and when the secondary function has been selected, transmitting the required driver from the USB device to the computer. This enables the computer to map the required driver to the USB device to thus implement the secondary function on the computer.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
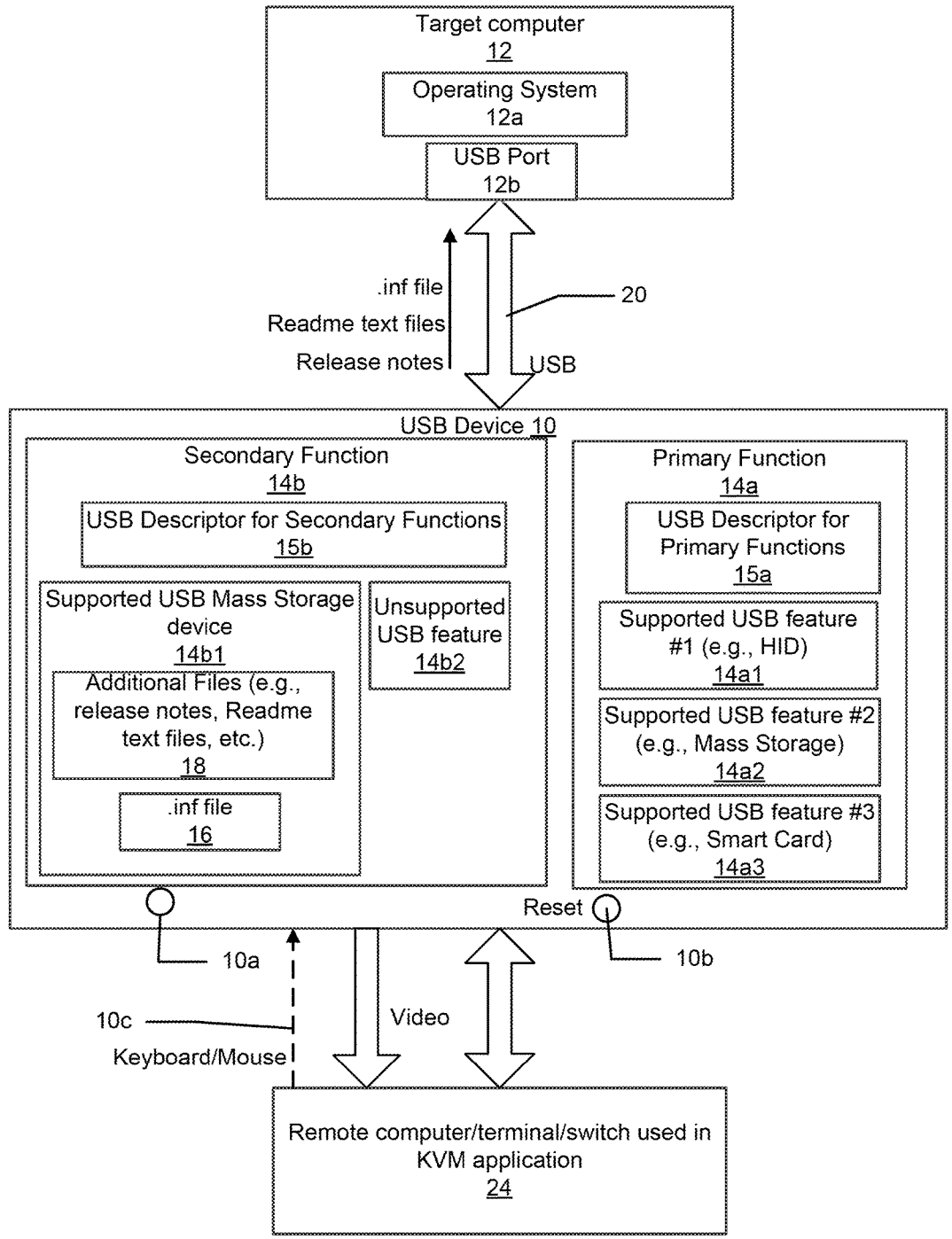
FIG. 1 is a high level block diagram illustrating how an .inf file of an unsupported USB device may be presented to an operating system of a target computer without the need for a wide area network (e.g., Internet) connection, and without the need to supply the .inf file on separate media directly to the target computer.

The following description is merely exemplary in nature and is not intended to limit the present disclosure, application, or uses. It should be understood that throughout the drawings, corresponding reference numerals indicate like or corresponding parts and features.

Referring to FIG. 1 there is shown a high level diagram of a USB device 10 communicating with a USB port 12b of a target device, in this example a target computer 12. The target computer 12 has an operating system 12a which includes various USB drivers needed to communicate with various USB devices, but in this example the USB device 10 is "unsupported". In this example the operating system will be assumed to be the Windows® operating system from Microsoft Corp. In the following text, when the term "unsupported" is used it is meant that the USB device 10 cannot be auto-mapped to a driver like "HID" or "Mass Storage" that is included as part of the Windows® operating system 12a. As such, the Windows® operating system 12a will not be able to automatically determine and apply the specific driver that the USB device 10 requires for use.

To illustrate the above supported and unsupported functionalities of the USB device 10, FIG. 1 shows the USB device as having both a Primary function 14a and a Secondary function 14b. The Primary function 14a may be implemented in this example by three supported USB features 14a1, 14a2 and 14a3 (e.g. HID, mass storage device and Smart Card, respectively). The Secondary function 14b will have a USB mass storage device 14b1 and have at least one unsupported USB feature 14b2.

The Secondary function 14b may be selected either via a switch 10a or via a software command 10c. For example, the software command may potentially be sent by the user while using software (e.g., DSView management software or via a remote debug application) running on a remote computer/ terminal 24 that the user is using.

The USB device 10 also includes a "Reset" switch 10b. Switches 10a and 10b may be pushbutton switches, although it will be appreciated that other types of switches may be used. For this example the Primary function 14a of the USB device 10 can be considered as the default mode that the USB device enters as soon as it is coupled to the target computer 12 and powered on by power received from the USB port 12b. Thus, no actuation of either of the switches 10a or 10b is required for the USB device 10 to begin performing its Primary function 14a when the USB device is initially coupled to the USB port 12b of the target computer 12 and first powered on. The Windows® operating system includes the necessary driver files to fully support the Primary function 14a of the USB device 10 (i.e., in this example the default mode of operation performs the Primary function).

In its Secondary function 14b the USB device 10 provides an unsupported feature to perform a different function. Put differently, the Secondary function 14b is not fully supported; it may be partially supported, meaning that the Windows® operating system has at least one driver to partially support the Secondary function, but it is still missing one or more drivers to fully enable the Secondary function. As a result of the Secondary function 14b not being fully supported, the Windows® operating system will not know how to enumerate the USB device 10 to enable the device to perform one or more aspects of its Secondary function.

Actuation of the switch 10a (or actuation via software command 10c) is necessary to initiate the Secondary function 14b of the USB device 10. Pressing the "Reset" button 10b performs a hardware (i.e., hard) reset of the USB device 10. This resets the USB device 10 to perform its Primary function 14a. Also, the USB device 10 may be reset to perform its Primary function 14a via a software reset. For example, the USB device 10 may be reset by supplying a software reset signal from a network switch, computer or terminal 24 which the USB device 10 is communicating with.

The USB device 10 in this example includes a USB descriptor 15a detailing what features are supported by Primary function 14a as well as a second USB descriptor 15b detailing what features are supported by Secondary function 14b. When the Primary function 14a is enumerated over USB 20 to the Windows® operating system 12a using the USB Descriptor for Primary functions 15a, this is considered normal operation, as the Windows® operating system 12a has the drivers to support the enumerated features 14a1, 14a2, and 14a3. When the Secondary function 14b is selected either by the switch 10a or the software command 10c, the USB device 10 re-enumerates over USB cable 20 to the Operating System 12a using the USB Descriptor for Secondary Functions 15b. The USB Descriptor for Secondary functions 15b contains the unsupported USB feature 14b2 as well as a Supported USB Mass Storage device 14b1 that contains the .inf file 16 required to support the Unsupported USB Feature 14b2 and additional files 18 such as release notes, "Readme" text files, user guides, etc. The Supported USB Mass Storage device 14b1 is enumerated and connected to the Operating System 12a first, so that the Operating System 12a has the files required to install/support the Unsupported USB feature 14b2.

Figure 2:
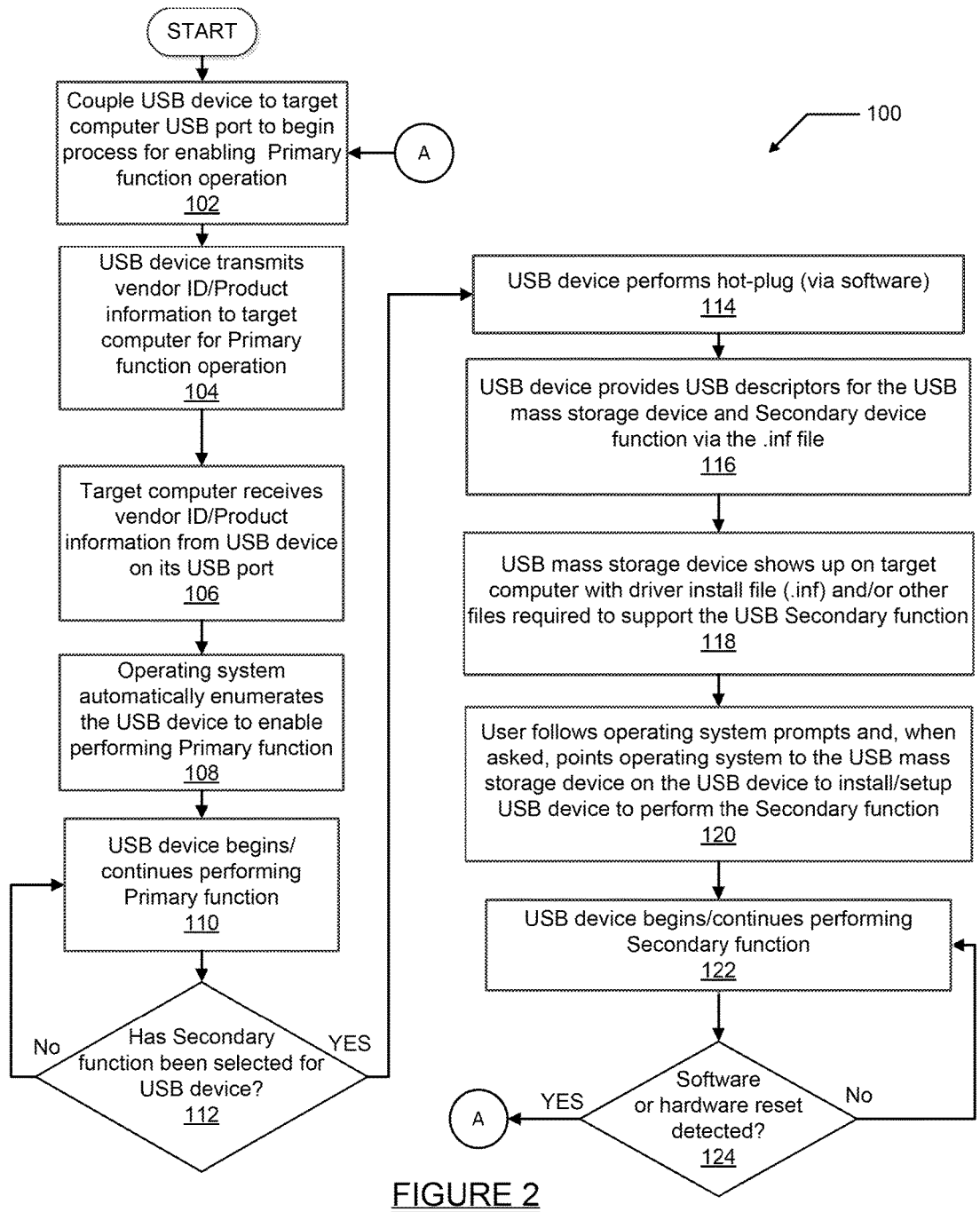
FIG. 2 is a flowchart illustrating a plurality of operations that may be carried out using the components shown in FIG. 1, to load a device driver from the unsupported USB device onto the operating system of the target computer.

Referring to FIG. 2, flowchart 100 shows one example of the operation of the software of the USB device 10 of the present disclosure. At operation 102 the USB device 10 is coupled to the USB port 12b of the target computer 12 to begin the process of enabling Primary function 14a operation of the USB device. At operation 104 the USB device 10 transmits its stored USB Descriptor 15a that contains the Vendor/Product ID for the device and supported USB features to the target computer 12 to enable Primary function 14a operation. At operation 106 the target computer 12 receives the USB Descriptor 15a provided by the USB device 10 for Primary function operation. At operation 108 the Windows® operating system 12a automatically enumerates the USB device 10 to enable the USB device to perform its Primary function 14a. At operation 110 the USB device 10 begins performing its Primary function 14a.

At operation 112 a check is made if the Secondary function button or switch 10a on the USB device 10 has been actuated (or if the software command 10c has been received, assuming no secondary function button or switch 10a is being used). If no actuation of the Secondary function button 10a (or software command 10c) is detected, then operation 110 is repeated. If the Secondary function button 10a is detected as having been actuated (or software command 10c has been detected), then at operation 114 the USB device 10 performs a hot-plug operation (i.e., it performs a software USB disconnect and then a re-connect to the USB bus). At operation 116 the USB device 10 provides USB descriptors for the Secondary Functions 15b which contains USB mass storage device 14a1 and the files required to support the Secondary function via the .inf file 16 (or script file). At operation 118 the USB mass storage device 14a1 shows up on the target computer 12 with the .inf file 16 (i.e., the driver install file) and/or any other files required to support the USB Secondary function 14b operation of the USB device 10.

At operation 120, when the Windows® operating system realizes that it does not have the needed driver(s) to enumerate the Unsupported USB Feature 14b2 of the USB Secondary function 14b, it will present a prompt on the user's display for the needed .inf file. The user then points the Windows® operating system to the USB mass storage device 14b1 on the USB device 10, where the .inf file 16 is stored, to install/setup the USB device 10 to perform the Unsupported USB Feature 14b2 of the Secondary function 14b, and thus to complete the enumeration of the USB device 10. At operation 122 the USB device 10 then begins performing the Secondary function 14b.

At operation 124 a check is made to determine if a software or hardware reset has been detected. The hardware reset would be via actuation of the Reset switch 10b by the user. If either type of reset is detected, then operations 102-110 are re-performed. If no reset is detected, then operation with the USB device 10 configured to perform the Secondary function 14b continues as indicated at operation 122.

While the USB device 10 has been described as having Primary 14a and Secondary 14b functions which can be selectively enabled, it is also possible to incorporate three or more functions in one USB device using the teachings of the present disclosure. For example, if the Secondary function 14b is selected either by switch 10a or by a software command 10c to implement an otherwise unsupported serial console functionality, then the serial console functionality could be used by the user to configure a third unsupported function. In this example the user could use the serial console function to provide one or more additional .inf files or drivers to the target computer 12 to enable a third or "tertiary" unsupported functionality to be implemented on the target computer 12. Alternatively, more than one secondary function may possibly be enabled, possibly by some combination of switches (or one or more software commands) by which the user is able to selectively initiate one of two or more different unsupported functions. The USB mass storage device 14b1 in such case would be loaded with the appropriate .inf files corresponding to each unsupported function. The Windows® operating system is provided with the appropriate .inf file corresponding to the specific selected function (i.e., unsupported function) that the user selects via a specific switch (or via one or more software commands). In this manner the Windows® operating system is able to map the needed driver(s) to the USB device 10 to provide the needed unsupported functionality. It will be appreciated, however, that the only limitation is the number of USB ports within the USB device 10 that can be enumerated. In the example presented herein, the USB device 10 includes an internal three port USB hub which allows enumerating 3 USB devices for the USB device 10: a USB HID (keyboard and mouse); the USB mass storage device 14, and either the Smart Card or the USB Secondary function.

The USB device 10 and its method of operation thus form a means by which a single USB device can be provided with two or more functions, where one or more of the functions are unsupported by the Windows® operating system. One significant advantage that the USB device 10 provides is that it is able to supply the needed .inf file to the Windows® operating system without requiring a wide area network (e.g., Internet) connection, and without the need to physically load the .inf file onto a disc or separate USB component (e.g., a flash drive) that would itself need to be physically plugged into a USB port of the target computer. The USB device 10 of the present disclosure is particularly advantageous for KVM applications where it would be impractical to have to load the .inf file onto every different computer that the user may have access to during a KVM session.

Still another advantage of the USB device 10 is that it may be provided with software updates and/or its secondary function may be changed via software updates, without requiring any hardware modification to the USB device 10. In this manner an existing USB device 10 may be updated by software to perform different secondary functions as the user's needs change.

Figure 3:
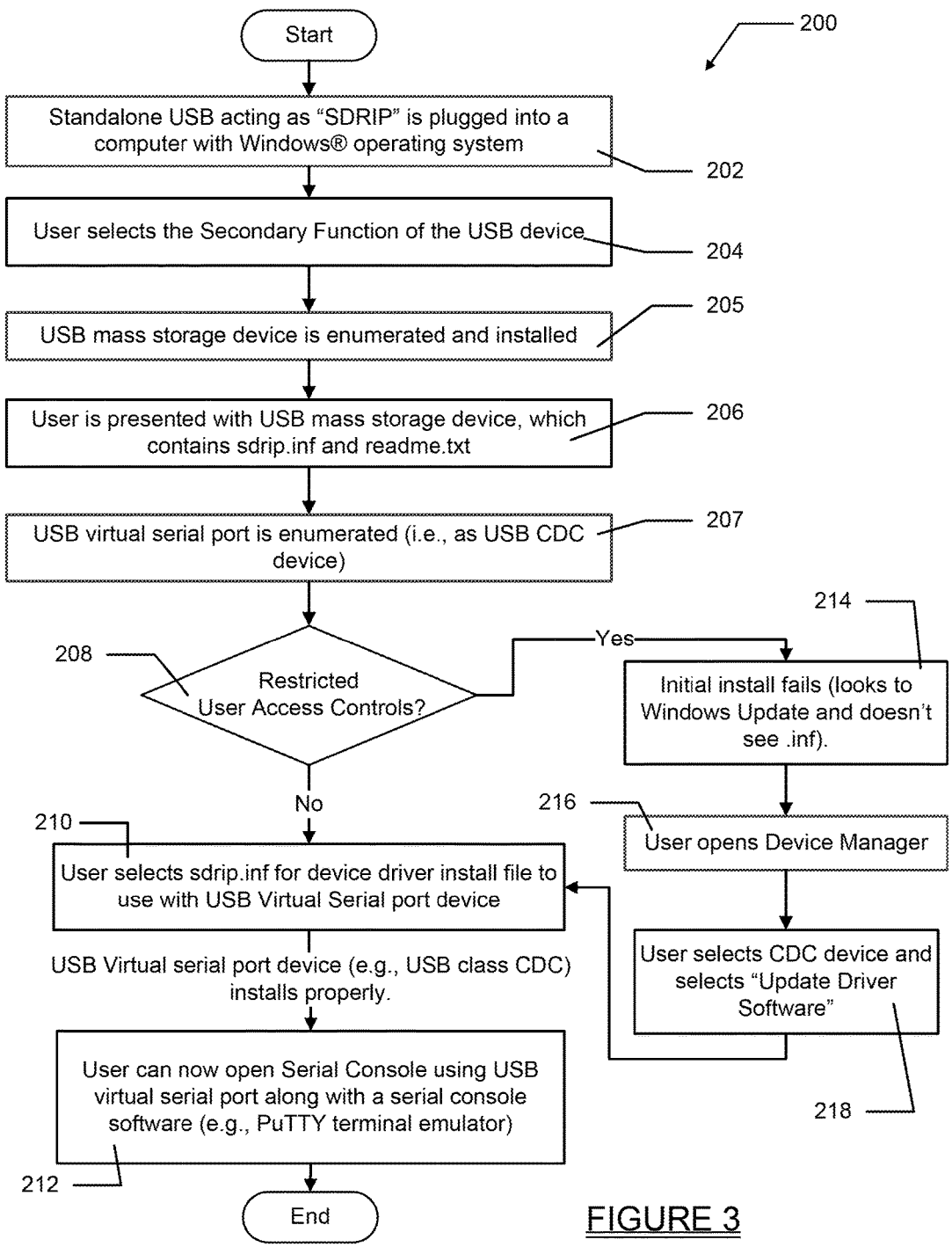
FIG. 3 is flowchart illustrating one specific implementation of the present disclosure being used to implement a serial console functionality as the secondary functionality for the USB device.

Referring further to FIG. 1 and FIG. 3, one specific implementation of the USB device 10 will be described in which the USB device operates as a KVM (Keyboard/Video/Mouse) appliance, and more specifically as a digital rack interface pod ("DRIP") which provides the KVM appliance functionality, to enable a KVM session between the remote computer/terminal 24 and the computer 12. So it will be understood in this example that the USB device 10, functioning as a KVM appliance, communicates keyboard and mouse signals from a remote computer/terminal 24 to the computer 12 (e.g., as Ethernet packets over a network), and video as analog signals from the computer 12 back to the remote computer/terminal 24.

When acting as a KVM appliance, however, the USB device 10, since it does not have a dedicated serial port (e.g., RS-232 port), would ordinarily not be able to provide a serial console capability. A serial console is usually needed in KVM applications to enable a user to perform initial commissioning (e.g., setting IP address, upgrading, etc.), as well as issuing a factory default restore of the KVM appliance. Thus, if a situation arose where the user could not access the USB device 10, a serial console would ordinarily be needed for the user to provide the necessary commands to perform various operations needed to reset the USB device 10 and to reestablish a KVM session. The present disclosure overcomes this significant limitation by enabling the USB device 10 to be configured with a serial console functionality as the Secondary function 14b.

Referring specifically to FIG. 3, a flowchart 200 illustrates various operations that may be performed to provide the serial console functionality to the USB device 10. It will be understood that in this example the USB device 10 is operating as a standalone DRIP with serial console capability (i.e., as an "SDRIP"), and is plugged into a USB port of a computer or terminal running the Microsoft Windows® operating system, as indicated at operation 202. The serial console capability enables the USB device 10 to be set to function as a USB virtual serial port device, which is a USB function/device which is not supported by the Windows® operating system.

At operation 204 the user actuates the secondary function switch 10a (or alternatively sends a software command), which in this example may be labelled or understood as providing a "Serial Console" function. If a physical switch is used, then the user preferably actuates the switch 10a (either pushing or sliding or toggling, depending on the specific switch employed) for at least about 1 second but for less than preferably about 5 seconds. Actuating the switch 10a for this interval signals the USB device 10 that it is being commanded to enter the serial console mode of operation. In response, at operation 205 the USB mass storage device 14a1 is enumerated and installed. At operation 206 the user is then presented with the USB mass storage device 14a1, which contains the sdrip.inf and readme.txt files. At operation 207 the USB virtual serial port is enumerated, and the Windows® operating system then requests the user to specify what driver to use. At operation 208 a check is made to determine if the user access controls are restricted. If not, then at operation 210 the user selects the sdrip.inf file as the device driver install file for use with the USB device 10. The USB virtual serial port device then installs properly. In this example it will be appreciated that the USB virtual serial port device is enumerated as a USB CDC class device, and more specifically as a CDC ACM class device.

At operation 212 the user can now open the serial console using the USB device 10 running as a USB virtual serial port, along with appropriate separate serial console software (e.g., the open source PuTTY terminal emulator).

If the check at operation 208 determines that the user access controls are restricted, then at operation 214 the initial install fails. In this instance the Windows® operating system looks to Windows® Update but doesn't see the sdrip.inf file. The user may then open the Device Manager on his/her computer, as indicated at operation 216. At operation 218 the user may select the CDC device and selects "Update Driver Software." At this point operation 210 may be performed.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A system for enabling implementation of a secondary function of a universal serial bus (USB) device on a computer that the USB device is communicating with, wherein an operating system of the computer does not have a required driver associated with the operating system which needs to be mapped to the USB device to enable implementation of at least one unsupported feature of the secondary function of the USB device, the system comprising:
   a USB device having a housing and being in communication with the computer and with an electronic device of a user, the USB device having a primary function along with the secondary function, the USB device including:
      a USB mass storage device housed in the USB device;
      at least one file stored on the USB mass storage device, the file being selectable by a user and including the required driver which needs to be mapped to the USB device by the computer to enable the unsupported feature of the secondary function on the computer; and
      a manually engagable switch on the housing which enables the user to access the secondary function of the USB device and to transmit at least one file from the USB device to the computer.

2. The system of claim 1, wherein the switch is engaged for a predetermined minimum time to enable the secondary function.

3. The system of claim 1, wherein the USB device is configured to recognize a command sent from the electronic device of the user to select the secondary function.

4. The system of claim 1, wherein the at least one file comprises a script file stored on the USB mass storage device available in the secondary function and used to configure the unsupported feature of the secondary function.

5. The system of claim 1, wherein the at least one file comprises a set of driver file(s) stored on the USB mass storage device available in the secondary function that allows configuring of the unsupported feature of the secondary function.

6. The system of claim 1, wherein the USB device includes a reset control for enabling a user to manually initiate a reset of the USB device.

7. The system of claim 6, wherein the reset control returns the USB device to its factory settings.

8. The system of claim 6, wherein the reset control comprises a switch.

9. The system of claim 6, wherein the reset control comprises a control command available via a virtual serial console implemented in the secondary function.

10. The system of claim 1, wherein the USB mass storage device has sufficient capacity to store at least one of:
vendor identification information;
product information regarding the USB device;
at least one file necessary to operate a secondary or tertiary function;
release notes; or
Readme text files.

11. The system of claim 1, wherein the USB device comprises a digital rack interface pod (DRIP).

12. The system of claim 1, wherein the USB device further comprises a tertiary function which is different from the primary function and the secondary function, and wherein the tertiary function is unsupported by the computer; and
wherein the tertiary function can be selected using at least one of a switch or a command sent from the electronic device of the user to supply an additional file to the computer to enable the tertiary function.

13. The system of claim 1, wherein the unsupported feature in the secondary function comprises a serial console functionality to enable the USB device to function as a virtual serial port device.

14. The system of claim 13, wherein the virtual serial port is used to enable an additional unsupported function of the USB device.

15. The system of claim 13, wherein the virtual serial port is used to enable, configure and/or control a tertiary function of the USB device.

16. A system for enabling implementation of both a primary function and a secondary function of a universal serial bus (USB) device on a computer that the USB device is communicating with, wherein an operating system associated with the computer does not have a required driver which needs to be mapped to the USB device to enable at least one unsupported feature of the secondary function, the system comprising:
a USB device in communication with an electronic device of a user and with the computer, the USB device including:
a USB mass storage device housed in the USB device;
a control for selecting between the primary function and the secondary function, wherein the control comprises a software command transmitted from the electronic device of the user to the USB device;
at least one file stored on the USB mass storage device, the at least one file including the required driver to enable the computer to implement the secondary function; and
the secondary function, once enabled, enabling the user to use the USB device to load an additional file to enable an unsupported tertiary function to be implemented.

17. The system of claim 16, further comprising a manually engageable switch which enables the user to select more than one different unsupported secondary function.

18. The system of claim 16, further comprising a switch used to implement a serial console command via the secondary function, that enables or disables the tertiary function.

19. A method for enabling implementation of a secondary function of a universal serial bus (USB) device on a computer that the USB device is communicating with, wherein an operating system of the computer does not have a required driver which needs to be mapped to the USB device to enable implementation of the secondary function of the USB device, the method comprising:
providing a USB device in communication with the computer and with an electronic device of a user;
providing the USB device with a primary function and a secondary function;
storing the required driver which enables the secondary function in a file on the USB device;
using a control on the USB device to enable a user to select the secondary function, the control including at least one of:
a manually engageable switch on the USB device, and
a software command sent from the user's electronic device to the USB device; and
when the secondary function has been selected, transmitting the required driver from the USB device to the computer to enable the computer to map the required driver to the USB device to thus enable the secondary function on the computer.

20. The method of claim 19, wherein storing the required driver comprises storing the required driver on a USB mass storage device contained in the USB device.

21. A system for enabling implementation of a secondary function of a universal serial bus (USB) device on a computer that the USB device is communicating with, wherein an operating system of the computer does not have a required driver associated with the operating system which needs to be mapped to the USB device to enable implementation of at least one unsupported feature of the secondary function of the USB device, the system comprising:
a USB device in communication with the computer and with an electronic device of a user, the USB device having a primary function along with the secondary function, the USB device including:
a USB mass storage device housed in the USB device;
at least one file stored on the USB mass storage device, the file being selectable by a user and including the required driver which needs to be mapped to the USB device by the computer to enable the unsupported feature of the secondary function on the computer; and
a control which enables the user to access the secondary function of the USB device and to transmit at least one file from the USB device to the computer; and
wherein the control is a command sent from the electronic device of the user which is recognized by the USB device to select the secondary function.

* * * * *